United States Patent
Fukuda

(10) Patent No.: US 11,994,170 B2
(45) Date of Patent: May 28, 2024

(54) DIFFERENTIAL GEAR

(71) Applicant: KANZAKI KOKYUKOKI MFG. CO., LTD., Amagasaki (JP)

(72) Inventor: Toshiyuki Fukuda, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 0 days.

(21) Appl. No.: 17/672,191

(22) Filed: Feb. 15, 2022

(65) Prior Publication Data

US 2022/0170512 A1 Jun. 2, 2022

Related U.S. Application Data

(63) Continuation of application No. 16/124,341, filed on Sep. 7, 2018, now abandoned.

(60) Provisional application No. 62/555,978, filed on Sep. 8, 2017.

(51) Int. Cl.
| | |
|---|---|
| *F16D 1/08* | (2006.01) |
| *F16H 48/12* | (2012.01) |
| *F16H 48/38* | (2012.01) |
| *B60K 17/16* | (2006.01) |

(52) U.S. Cl.
CPC ............. *F16D 1/08* (2013.01); *F16H 48/12* (2013.01); *F16H 48/38* (2013.01); *B60K 17/165* (2013.01); *F16H 2048/382* (2013.01)

(58) Field of Classification Search
CPC . F16D 1/08; F16H 48/12; F16H 48/38; F16H 2048/382; F16H 48/08; F16H 2048/085; F16H 2048/087; B60K 17/165
See application file for complete search history.

(56) References Cited

U.S. PATENT DOCUMENTS

| | | | |
|---|---|---|---|
| 3,580,108 A | 5/1971 | Mieras | |
| 3,593,595 A | 7/1971 | Taylor | |
| 5,186,694 A * | 2/1993 | Cooper | F16H 48/08 |
| | | | 475/230 |
| 6,254,505 B1 * | 7/2001 | Forrest | F16H 48/30 |
| | | | 475/230 |

(Continued)

FOREIGN PATENT DOCUMENTS

| | | |
|---|---|---|
| JP | 2015016771 A | 1/2015 |
| JP | 6160994 B2 | 7/2017 |

OTHER PUBLICATIONS

USPTO Non-Final Office Action for corresponding U.S. Appl. No. 16/124,341 dated Aug. 16, 2021.

*Primary Examiner* — Victor L MacArthur
(74) *Attorney, Agent, or Firm* — CANTOR COLBURN LLP

(57) ABSTRACT

A differential gear includes a holder which is provided between first and second pinion gears in a differential case and through which a differential pinion shaft is inserted. An insertion hole is radially formed in the differential pinion shaft. The holder is formed with a fixing hole facing the insertion hole when the differential pinion shaft is inserted through the holder. Due to insertion of a fixing pin through the fixing hole and the insertion hole, the differential pinion shaft and the holder are relatively non-rotatable. Due to the holder being held between first and second side gears, relative rotation of the holder with respect to the differential case is restricted, and the differential pinion shaft is non-rotatable relative to the differential case.

1 Claim, 12 Drawing Sheets

(56) References Cited

U.S. PATENT DOCUMENTS

| | | |
|---|---|---|
| 2003/0054914 A1 | 3/2003 | Tomari et al. |
| 2004/0157696 A1 | 8/2004 | Saito et al. |
| 2008/0242469 A1 | 10/2008 | Jenski et al. |
| 2008/0261748 A1 | 10/2008 | Sudorowski et al. |
| 2010/0251706 A1* | 10/2010 | Edler ................... F16D 43/284 60/435 |
| 2012/0028750 A1* | 2/2012 | Mizoguchi .............. F16H 48/40 475/230 |
| 2015/0204431 A1* | 7/2015 | Cochren ................ F16H 48/34 475/150 |
| 2017/0204956 A1 | 7/2017 | Martin et al. |
| 2017/0328460 A1 | 11/2017 | Schulte |
| 2018/0245677 A1* | 8/2018 | Yoshisaka ............... F16H 48/06 |
| 2019/0113082 A1 | 4/2019 | Fukuda |

* cited by examiner

DIFFERENTIAL GEAR

CROSS-REFERENCE TO RELATED APPLICATIONS

The present application is a continuation application of U.S. patent application Ser. No. 16/124,341, filed on Sep. 7, 2018, the entire contents of which are incorporated herein by reference. The Ser. No. 16/214,341 application claimed the benefit of the date of the earlier filed U.S. Provisional Application No. 62/555,978 filed on Sep. 8, 2017, priority to which is also claimed herein, and the contents of which are also incorporated by reference herein.

BACKGROUND OF THE INVENTION

Field of the Invention

At least one embodiment of the present invention relates to a differential gear.

Description of the Related Art

Conventionally, as disclosed in JP 6160994B, for example, a differential gear has been known in which a differential pinion shaft is housed in a differential case, a pinion gear rotatable with reference to the differential pinion shaft is disposed, and a side gear meshes with the pinion gear.

In the differential gear as described above, a technique has been known in which a hole is formed in a direction perpendicular to the differential pinion shaft in the outer peripheral surface of the differential case so that the differential pinion shaft does not rotate relative to the differential case, and a fixing pin is inserted through the hole and the differential pinion shaft. However, in this case, a space for forming the hole in the differential case is needed, which entails a problem that the size of the differential case in the axial direction of the differential pinion shaft is increased.

SUMMARY OF THE INVENTION

At least one embodiment of the present application provides a differential gear that restricts relative rotation of a differential pinion shaft with respect to a differential case and that can reduce the size of the differential case in an axial direction of the differential pinion shaft.

In order to achieve the above-mentioned object, a differential gear includes: a final gear; a differential case to which the final gear is fixed on an outer peripheral surface so as to be integrally rotatable; a differential pinion shaft that is inserted through a shaft support hole formed in the differential case and that is housed in the differential case such that an axial direction is along a direction perpendicular to a rotation axis of the differential case; first and second pinion gears rotatably supported about an axis of the differential pinion shaft around both ends of the differential pinion shaft inside the differential case; and first and second side gears that are disposed inside the differential case at a predetermined space, mesh with the first and second pinion gears, and are housed in the differential case so as to be rotatable with reference to an identical rotation axis to the differential case, where a bulging portion having a flat surface perpendicular to the rotation axis of the differential case is provided at a central part of the differential pinion shaft, and the flat surface is brought into direct or indirect contact with an inner surface of at least one of the first and second side gears.

Further, in order to achieve the above-mentioned object, in the differential gear, the final gear is fixed to the differential case such that a part of an inner peripheral surface of the final gear overlaps the shaft support hole.

Further, in order to achieve the above-mentioned object, in the differential gear, the bulging portion is a holder that is provided between the first and second pinion gears in the differential case and through which the differential pinion shaft is inserted, the holder having a width substantially equal to the predetermined space between the first and second side gears and having the flat surface on respective end surfaces, the differential pinion shaft has an insertion hole radially formed at a portion that is to be inserted through the holder, the holder is formed with a fixing hole facing the insertion hole when the differential pinion shaft is inserted, the differential pinion shaft and the holder are relatively non-rotatable by insertion of a fixing pin into the fixing hole and the insertion hole, and due to attachment of the holder to the first and second side gears, relative rotation of the holder with respect to the differential case is restricted and the differential pinion shaft is non-rotatable relative to the differential case.

Further, in order to achieve the above-mentioned object, in the differential gear, the bulging portion is a holder that is provided between the first and second pinion gears in the differential case, the holder having a width substantially equal to the predetermined space between the first and second side gears and having the flat surface on respective end surfaces, the differential pinion shaft has an engaging portion formed at a middle part in an axial direction, the holder is dividable so as to be externally attached to the differential pinion shaft and has an engaged portion to be engaged with the engaging portion on an inner peripheral surface, the engaging portion and the engaged portion are engaged with each other to make the differential pinion shaft and the holder relatively non-rotatable, and due to attachment of the holder to the first and second side gears, relative rotation of the holder with respect to the differential case is restricted and the differential pinion shaft is non-rotatable relative to the differential case.

Further, in order to achieve the above-mentioned object, a differential gear includes: a final gear; a differential case to which the final gear is fixed on an outer peripheral surface so as to be integrally rotatable; first and second differential pinion shafts that are inserted through a shaft support hole formed in the differential case and housed in the differential case so as to be mutually orthogonal such that an axial direction is along a direction perpendicular to a rotation axis of the differential case; first and second pinion gears rotatably provided about an axis of the first differential pinion shaft around the first differential pinion shaft inside the differential case; third and fourth pinion gears rotatably provided about an axis of the second differential pinion shaft around the second differential pinion shaft inside the differential case; first and second side gears that mesh with the first, second, third, and fourth pinion gears in the differential case and are housed so as to be rotatable with reference to an identical rotation axis to the differential case; and a holder that is housed between the first, second, third, and fourth pinion gears in the differential case and through which the first differential pinion shaft and the second differential pinion shaft are inserted, where the first differential pinion shaft and the second differential pinion shaft are engaged with each other in the holder so as to be non-rotatable relative to the differential case.

As described above, in the differential gear, the differential pinion shaft is unable to rotate relative to the differential case via the holder disposed between the pinion gears. Therefore, it is not necessary to form an insertion hole for inserting the fixing pin in the differential case, which is advantageous in that the size of the differential case in the axial direction of the differential pinion shaft can be reduced.

These and other features and advantages will become apparent from the following detailed description of the invention with reference to the accompanying drawings.

BRIEF DESCRIPTION OF THE DRAWINGS

Hereinafter, several embodiments will be described with reference to the attached drawings, but the embodiments and the drawings are merely examples and are not limitative. In the several drawings, the same reference numerals are given to the same elements.

DETAILED DESCRIPTION OF PREFERRED EMBODIMENTS

A differential gear 10 according to a first embodiment will be described with reference to FIGS. 1 to FIG. 5. The differential gear 10 according to the present embodiment is applied, for example, as a front differential gear in a four-wheel-drive all-terrain vehicle. The differential gear 10 receives power from a power transmission shaft extending forward of a transmission (not shown) arranged at the central portion of a vehicle in a front-rear direction via an input member 17 and an input gear 21 which are an input unit of the differential gear 10, and transmits the power to front wheels via axle shafts 67 and 68 which are an output unit of the differential gear 10.

Hereinafter, description will be given on the premise that the differential gear 10 is applied as a front differential gear disposed with the input unit facing rearward and the output unit facing forward. Note that the differential gear 10 can also be applied, for example, as a rear differential gear of a four-wheel-drive all-terrain vehicle with the input unit facing forward and the output unit facing rearward.

Figure 1:
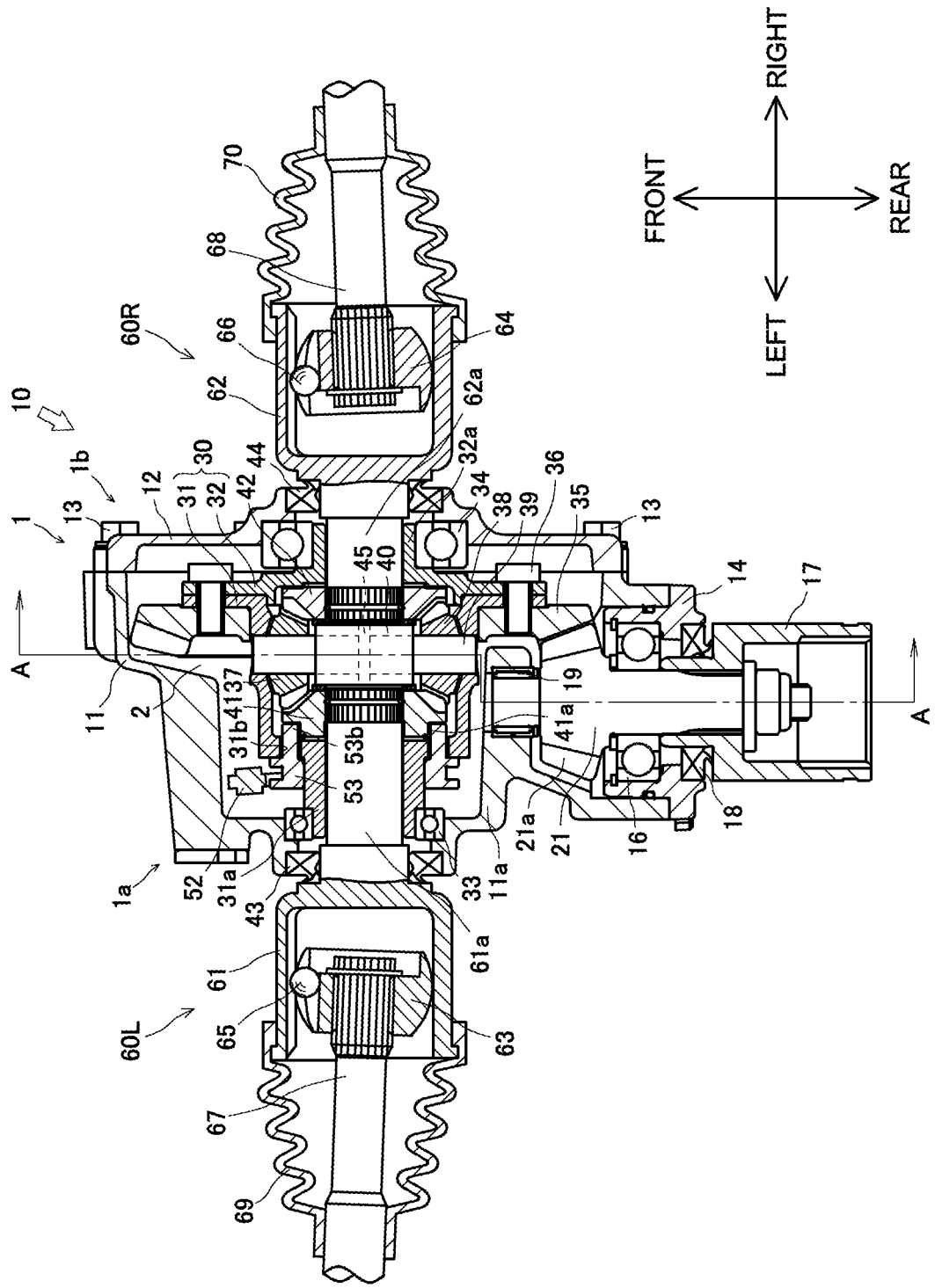
FIG. 1 is a sectional plan view of a differential gear according to a first embodiment in a state in which both axle shafts are attached.
Figure 2:
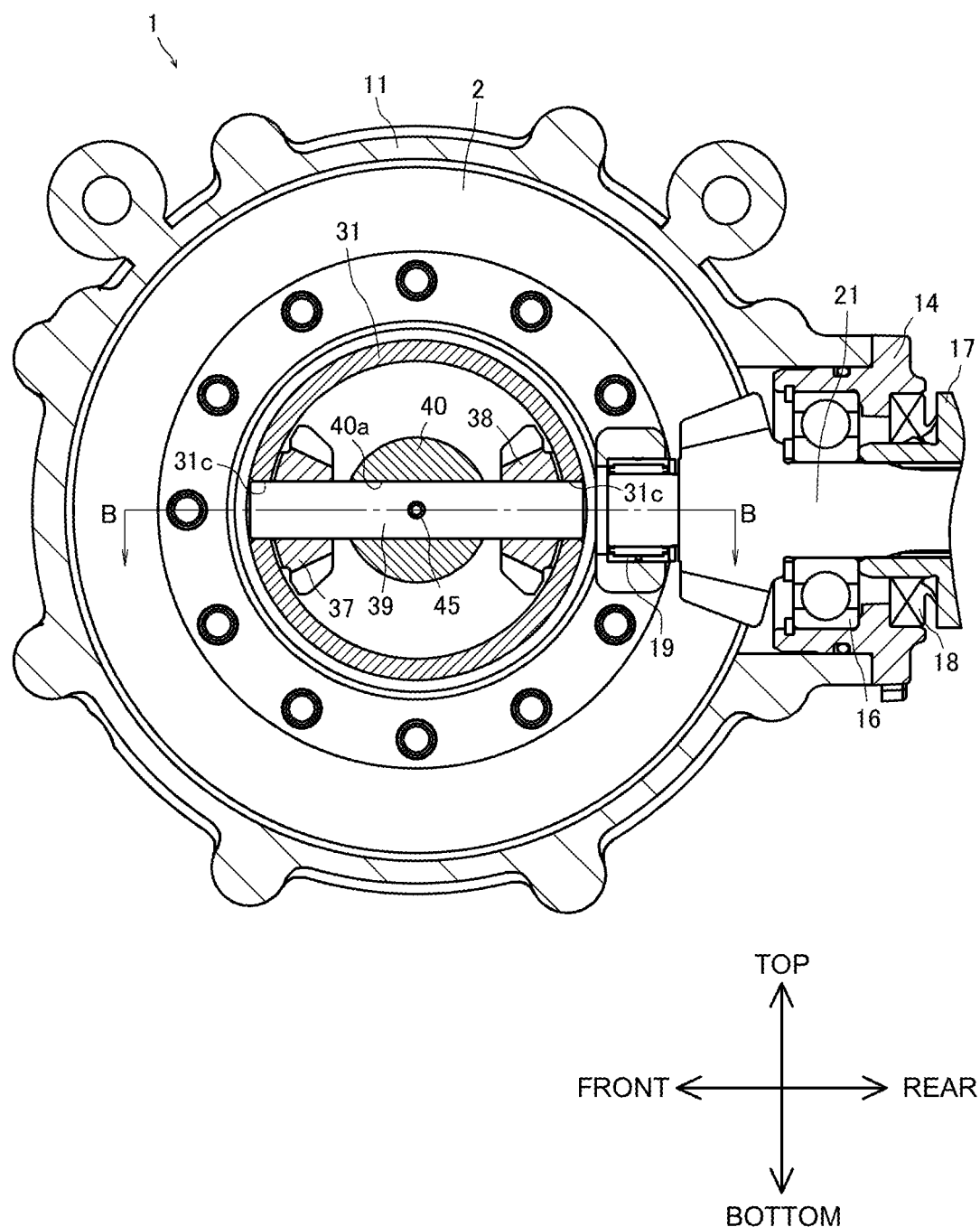
FIG. 2 is a cross-sectional view taken along a line A-A in FIG. 1.
Figure 3:
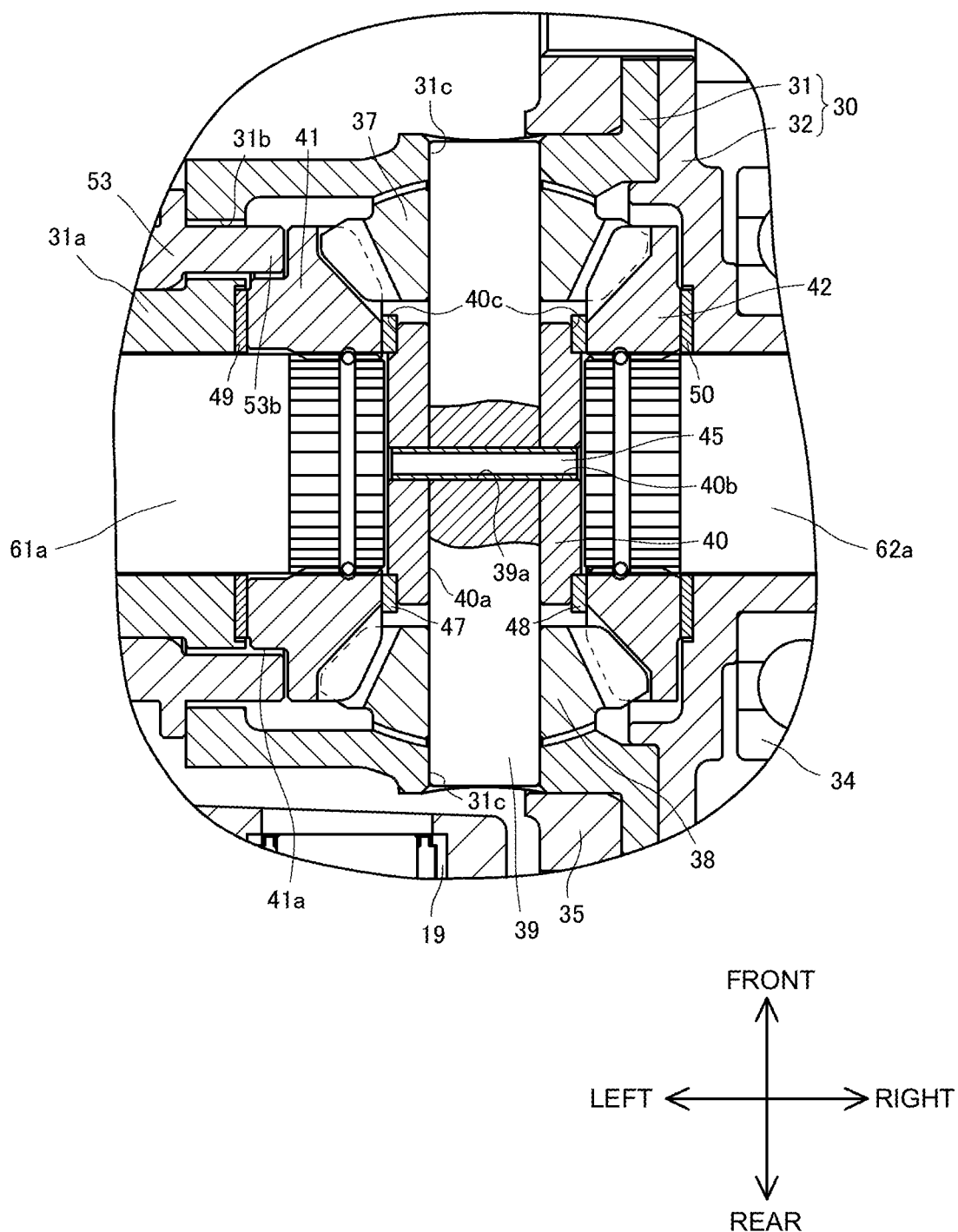
FIG. 3 is a cross-sectional view taken along a line B-B in FIG. 2.

As shown in FIGS. 1 to FIG. 3, the differential gear 10 includes an axle housing 1, an input gear 21, a differential case 30, a final gear 35, first and second side gears 41 and 42, first and second pinion gears 37 and 38, a differential pinion shaft 39, a holder 40, and the like as main components. In the present specification, directions of the differential gear 10 are defined by arrows shown in each drawing. For convenience of description, the final gear 35 and the second side gear 42 are not shown in FIG. 2. The respective components will be described below in order.

The axle housing 1 includes a housing body member 11, a side cover member 12, and a rear cover member 14. A cylindrical differential gear housing portion 11a having a right-side opening is formed in the front part of the housing body member 11.

The right-side opening of the differential gear housing portion 11a of the housing body member 11 is closed by the side cover member 12, and the side cover member 12 is fixed to the housing body member 11 by means of bolts 13. A differential gear chamber 2 of the axle housing 1 is formed inside the differential gear housing portion 11a of the closed housing body member 11. In addition, a rear opening at the rear end of the housing body member 11 is closed by the rear cover member 14.

A front-rear intermediate part of the input gear 21 whose axial direction is along the front-rear direction is rotatably supported to the rear cover member 14 via a bearing 16. The front end of the input gear 21 is rotatably supported by the differential gear housing portion 11a via a needle bearing 19. A bevel gear tooth portion 21a is formed on the outer peripheral surface of the input gear 21. A front end of the input member 17 is coupled to the rear end of the input gear 21 by spline fitting. The front end of the power transmission shaft (not shown) is connected to the input member 17, whereby the rotation of the power transmission shaft is transmitted to the input member 17 and the input gear 21. A seal member 18 is interposed between the inner peripheral surface of the rear cover member 14 and the outer peripheral surface of the input member 17.

The differential case 30 whose axial direction is along the left-right direction is provided in the differential gear chamber 2 of the axle housing 1 so as to be rotatably supported by the axle housing 1 via a first bearing 33 and a second bearing 34 disposed in the differential gear chamber 2. The outer peripheral surface of the first bearing 33 is fitted to the inner peripheral surface of the differential gear housing portion 11a of the housing body member 11 constituting the central portion in the left-right direction and the left side end of the differential gear chamber 2. The outer peripheral surface of the second bearing 34 is fitted to the inner peripheral surface of a cylindrical portion formed in the side cover member 12 constituting the right side end of the differential gear chamber 2.

The differential case 30 is formed by integrally combining a cylindrical left differential case 31 having a right-side opening and a disk-shaped right differential case 32 such that the right differential case 32 is brought into contact with the opening of the left differential case 31.

The final gear 35 which is a ring-shaped bevel gear is connected to the differential case 30 so as to be relatively non-rotatable. Specifically, in a state in which the left differential case 31 is inserted inside the final gear 35, the bolt 36 passing through the left differential case 31 and the right differential case 32 is screwed into the final gear 35, whereby the left differential case 31, the right differential case 32, and the final gear 35 are integrally coupled. The final gear 35 in the differential gear chamber 2 meshes with the bevel gear tooth portion 21a of the input gear 21. Thus, the rotation of the power transmission shaft input from the input member 17 and the input gear 21 is transmitted to the differential case 30 via the final gear 35.

A first end side boss 31a that protrudes to the left side which is a first end 1a side of the axle housing 1 is formed on the left side part of the left differential case 31, as described later. The outer peripheral surface of the first end side boss 31a is fitted to the inner peripheral surface of the first bearing 33. Further, a second end side boss 32a that protrudes to the right side which is a second end 1b side of the axle housing 1 is formed on the right side part of the right differential case 32, as described later. The outer peripheral surface of the second end side boss 32a is fitted to the inner peripheral surface of the second bearing 34. Thus, the differential case 30 is rotatably supported by the axle housing 1 via the left and right bearings 33 and 34.

An insertion hole 31b passing through the left differential case 31 is formed in the left differential case 31 at a portion radially outside the first end side boss 31a. A lock pin 53b of a differential lock slider 53 described later is inserted into the insertion hole 31b.

Figure 5:
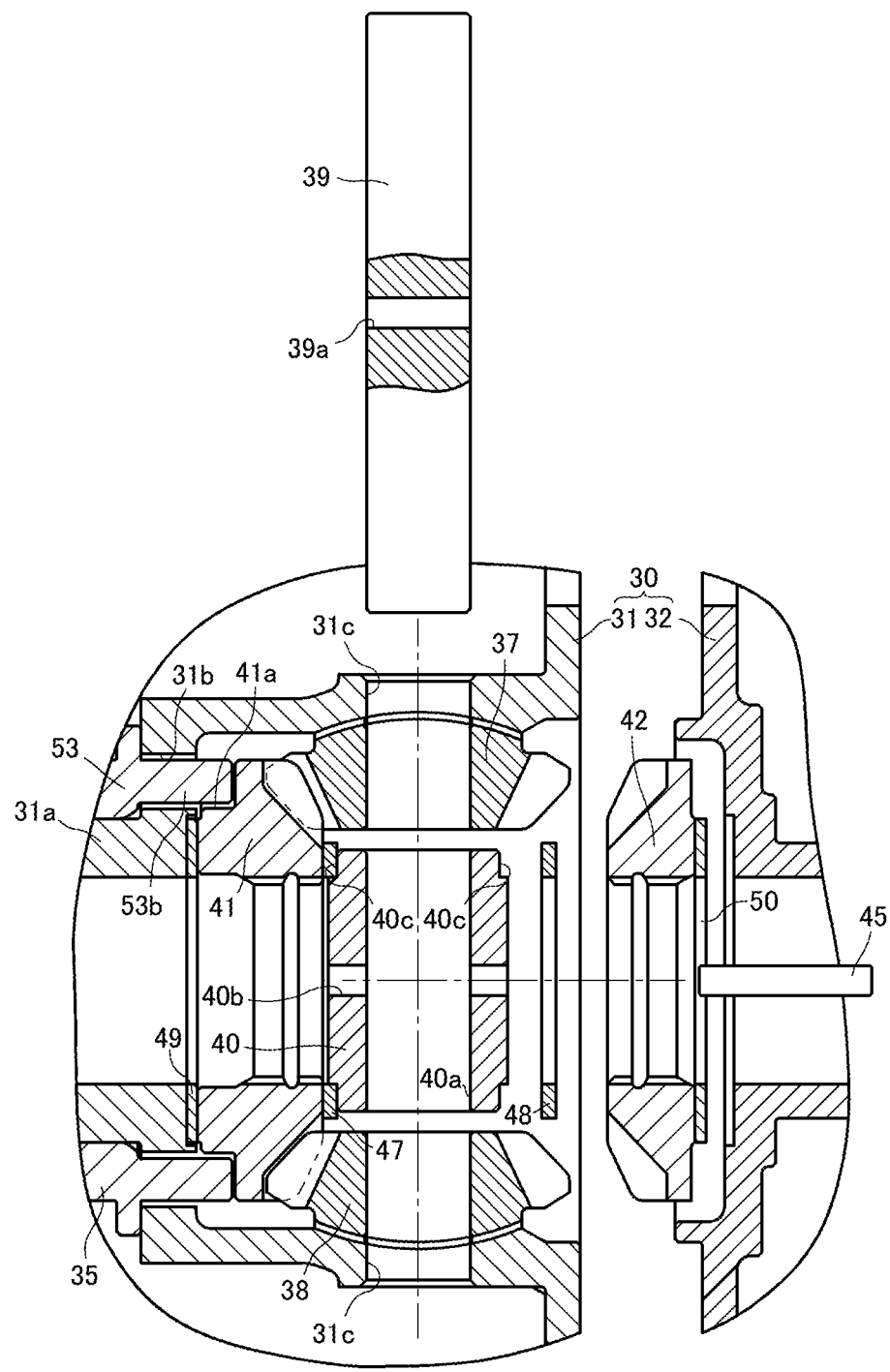
FIG. 5 is a cross-sectional view showing a procedure for assembling the differential case in the differential gear according to the first embodiment.

A pair of bevel gears, that is, the first side gear 41 and the second side gear 42, are housed in the differential case 30. Both the first side gear 41 and the second side gear 42 are disposed coaxially with the differential case 30. As shown in FIGS. 3 and FIG. 5, a plain bearing 49 is interposed between the left end surface of the first side gear 41 and the inner peripheral surface of the left differential case 31. Further, a plain bearing 50 is interposed between the right end surface of the second side gear 42 and the inner peripheral surface of the right differential case 32.

Spline shaft portions 61a and 62a of the output shafts 61 and 62 are spline-fitted to spline grooves formed in the inner peripheral surfaces of the first and second side gears 41 and 42, whereby the rotation of the first and second side gears 41 and 42 can be transmitted to the output shafts 61 and 62. A lock groove 41a is formed in the first side gear 41. The lock pin 53b of the differential lock slider 53 can move forward and backward in the lock groove 41a.

The left and right axle shafts 67 and 68 are connected to the differential gear 10 via left and right output shafts 61 and 62 and constant-velocity joints 60L and 60R. The spline shaft portions 61a and 62a are formed at inner end portions of the output shafts 61 and 62.

The constant-velocity joints 60L and 60R have tubular portions formed at the outer end portions of the output shafts 61 and 62, inner shaft portions 63 and 64 of the left and right axle shafts 67 and 68, the inner shaft portions being inserted in the tubular portions, and a plurality of balls 65 and 66 arranged in grooves between the tubular portion and the inner shaft portions 63 and 64. Covers 69 and 70 made of a stretchable elastic material are provided between the tubular portion and the axle shafts 67 and 68. This permits oscillation displacement while enabling power transmission between the output shafts 61 and 62 and the axle shafts 67 and 68.

The differential gear 10 can be switched between a locked state and an unlocked state by a locking differential mechanism. The locking differential mechanism includes a solenoid actuator (not shown), a fork 52, and a differential lock slider 53. When the solenoid actuator is driven, the fork 52 swings. Thus, when the lock pin 53b of the differential lock slider 53 is inserted into the lock groove 41a, the differential gear is in the locked state. On the other hand, when the lock pin 53b is retracted from the lock groove 41a, the differential gear is in the unlocked state.

The axle housing 1 has first and second ends 1a and 1b which face in opposite directions in the left-right direction which is the axial direction of the first and second side gears 41 and 42. Specifically, in the housing body member 11 that defines one side end of the differential gear chamber 2, a side opposite to the side cover member 12 is the first end 1a, and the side where the side cover member 12 defining the other side end of the differential gear chamber 2 is the second end 1b. A first oil seal 43 is interposed between the first end 1a of the axle housing 1 and the spline shaft portion 61a. A second oil seal 44 is interposed between the second end 1b of the axle housing 1 and the spline shaft portion 62a.

Figure 4:
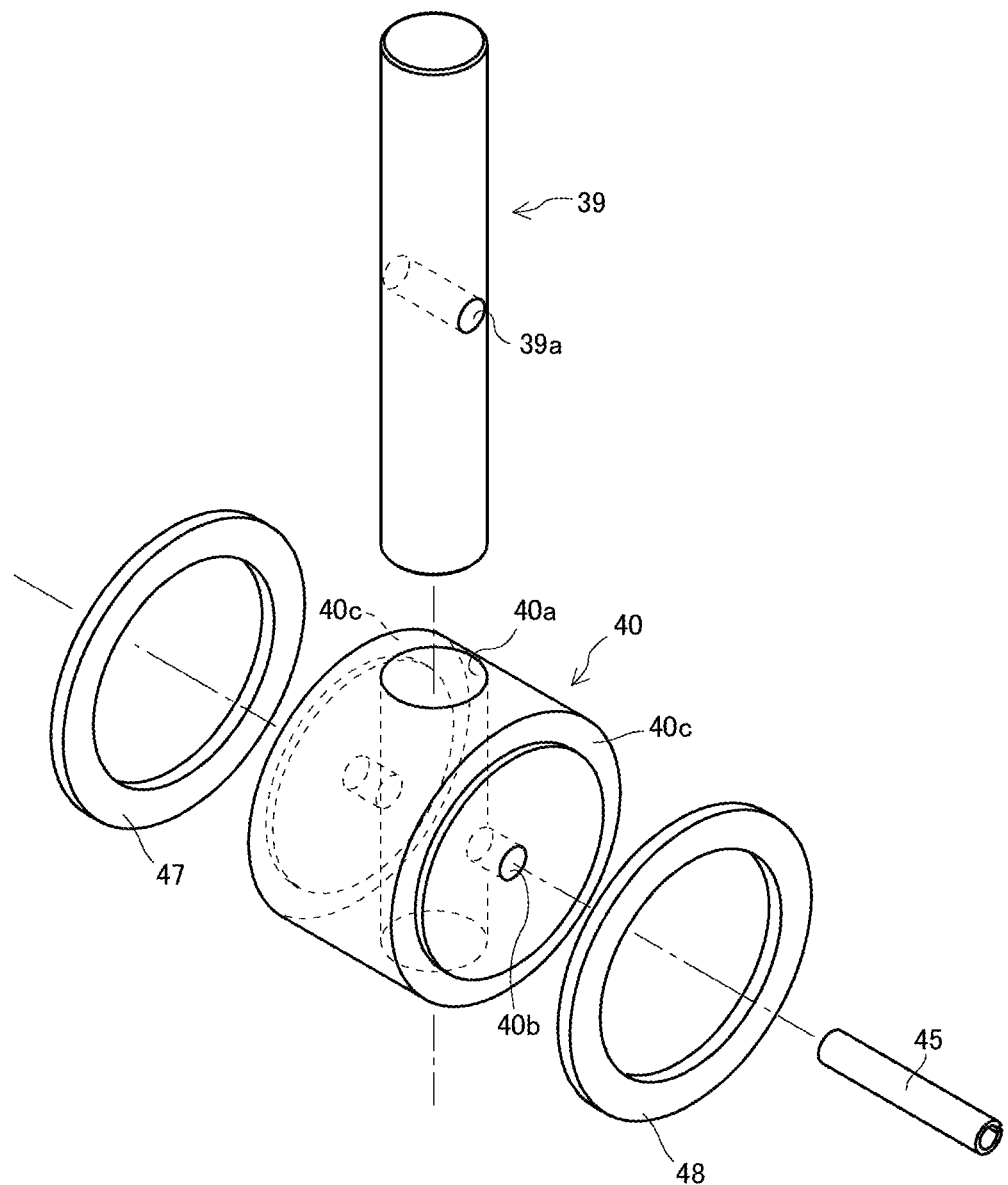
FIG. 4 is a perspective view showing a state where a differential pinion shaft is mounted to a holder in the differential gear according to the first embodiment.

The differential pinion shaft 39 is housed inside the differential case 30 such that the axial direction thereof is along a direction orthogonal to the rotation axis of the differential case 30 (front-rear direction in FIG. 1). Specifically, as shown in FIGS. 3 and 5, shaft support holes 31c and 31c are opened in the middle of the left differential case 31 in the left-right direction so as to face each other, and the differential pinion shaft 39 is inserted through the shaft support holes 31c and 31c. In a state where the differential case 30 and the final gear 35 are integrally coupled, the position where the final gear 35 is fixed is defined on the outer peripheral surface of the differential case 30 so that both end surfaces of the differential pinion shaft 39 are prevented from slipping out by an inner peripheral surface 35a of the final gear 35. As shown in FIGS. 3 to 5, an insertion hole 39a passing through the differential pinion shaft 39 in the diameter direction is formed at a substantially central position of the differential pinion shaft 39.

The first pinion gear 37 and the second pinion gear 38 are provided around the differential pinion shaft 39 inside the differential case 30 so as to be rotatable with reference to the axis of the differential pinion shaft 39. The first pinion gear 37 and the second pinion gear 38 are provided so as to mesh with the first and second side gears 41 and 42, respectively. The first side gear 41 and the second side gear 42 are connected via the first pinion gear 37 and the second pinion gear 38. Therefore, when either one of the first side gear 41 and the second side gear 42 rotates relative to the differential case 30, the other rotates in the opposite direction relative to the differential case 30.

The holder 40 into which the differential pinion shaft 39 is inserted is provided between the first pinion gear 37 and the second pinion gear 38 inside the differential case 30. As shown in FIG. 4, the holder 40 is a columnar member having a through hole 40a formed in the diameter direction. A fixing hole 40b passing through the holder 40 in the thickness direction (the left-right direction in the present embodiment) is formed at an axial part of the holder 40. As shown in FIG. 3, when the differential pinion shaft 39 is inserted through the holder 40, the fixing hole 40b faces the insertion hole 39a of the differential pinion shaft 39.

A fixing pin 45 which is a spring pin is inserted into the insertion hole 39a of the differential pinion shaft 39 and the fixing hole 40b of the holder 40. Thus, the differential pinion shaft 39 and the holder 40 cannot rotate relative to each other. To mount the differential pinion shaft 39 and the holder 40 to the differential case 30, the differential pinion shaft 39 is inserted into one of the shaft support holes 31c in a state where the first side gear 41 is brought into engagement with the first pinion gear 37 and the second pinion gear 38 and they are disposed in the left differential case 31 together with the holder 40, as shown in FIG. 5. Then, the differential pinion shaft 39 is inserted into the other shaft support hole 31c through the first pinion gear 37, the holder 40, and the second pinion gear 38 in this order. Thereafter, the fixing pin 45 is inserted into the holder 40 and the differential pinion shaft 39, the second side gear 42 is brought into engagement with the first pinion gear 37 and the second pinion gear 38, and the right differential case 32 is attached to the left differential case 31.

Stepped portions 40c and 40c in which the outer peripheral end is reduced in the thickness direction are formed on both left and right side surfaces of the holder 40. Plain bearings 47 and 48 are externally fitted to the stepped portions 40c and 40c. As shown in FIG. 3, when the differential case 30 is assembled, the plain bearing 47 is interposed between the holder 40 and the first side gear 41, and the plain bearing 48 is interposed between the holder 40 and the second side gear 42. That is, the holder 40 is sandwiched between the first side gear 41 and the second side gear 42 via the plain bearings 47 and 48. With this configuration, relative rotation of the holder 40 with respect to the differential case 30 is restricted. That is, the differential pinion shaft 39, which cannot be rotated relative to the holder 40, also cannot be rotated relative to the differential case 30.

In the differential gear 10 according to the present embodiment, when the differential pinion shaft 39 is fixed so as not to rotate relative to the differential case 30, the holder 40 is provided between the first pinion gear 37 and the second pinion gear 38 in the differential case 30, the differential pinion shaft 39 is inserted into the holder 40, and the fixing pin 45 is inserted to inhibit the relative rotation between the holder 40 and the differential pinion shaft 39, as described above. Then, the holder 40 is held by the first side gear 41 and the second side gear 42, whereby the differential pinion shaft 39 is relatively non-rotatable with respect to the differential case 30.

Thus, according to the present embodiment, it is unnecessary to form a hole, into which the fixing pin for the differential pinion shaft 39 is inserted, in the outer peripheral surface of the differential case 30 in a direction orthogonal to the differential pinion shaft 39. Therefore, the size of the differential case 30 in the axial direction of the differential pinion shaft 39 can be reduced. Accordingly, it is easy to secure a space for disposing the needle bearing 19 supporting the front end of the input gear 21.

Next, a differential gear according to a second embodiment will be described with reference to FIGS. 6 and FIG. 7. In the differential gear according to the following embodiment, the same reference numerals are given to the components common to the differential gear 10 according to the first embodiment, the detailed description thereof will be omitted, and a configuration different from the first embodiment will be mainly described.

Figure 6:
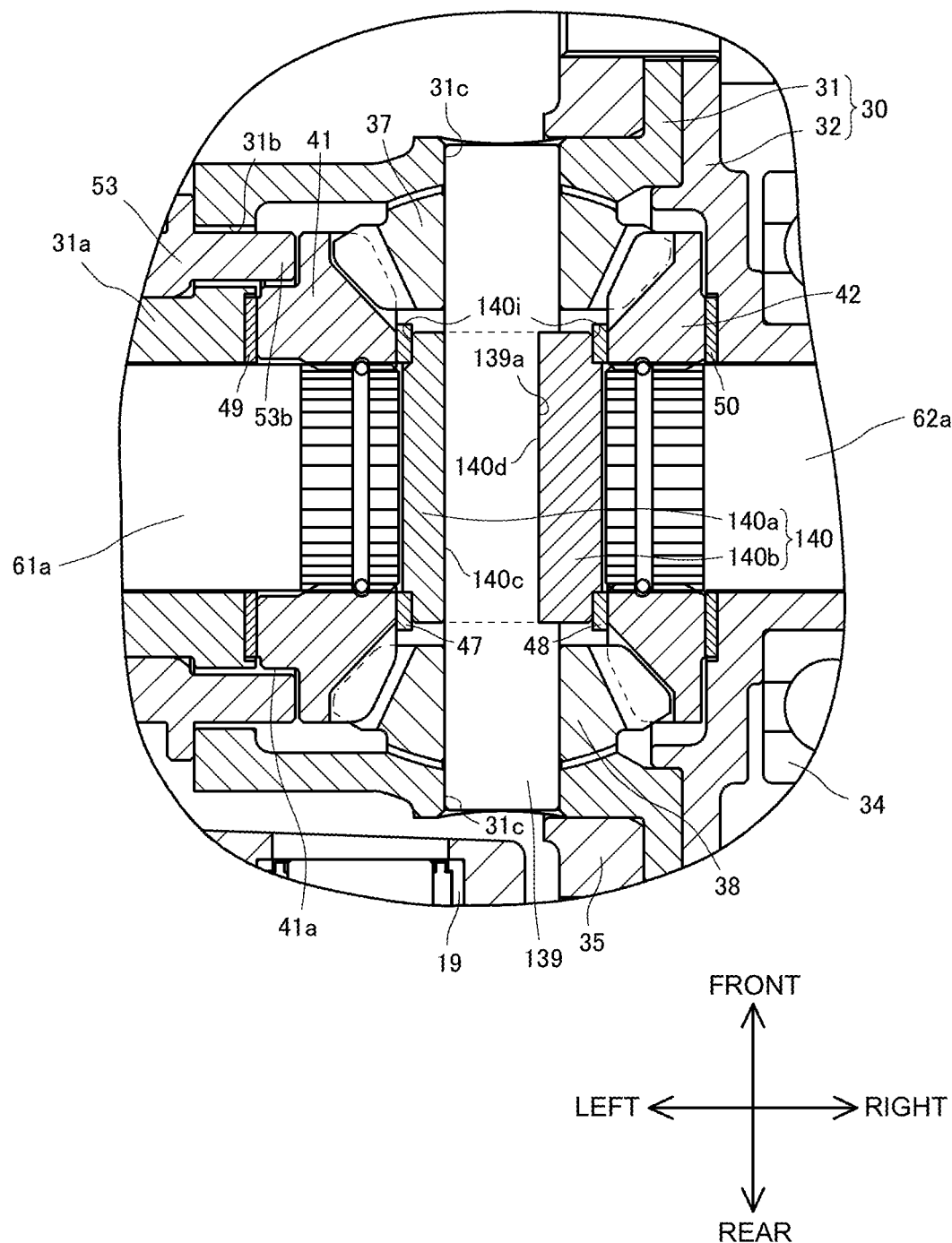
FIG. 6 is an enlarged sectional plan view of a differential gear according to a second embodiment.
Figure 7:
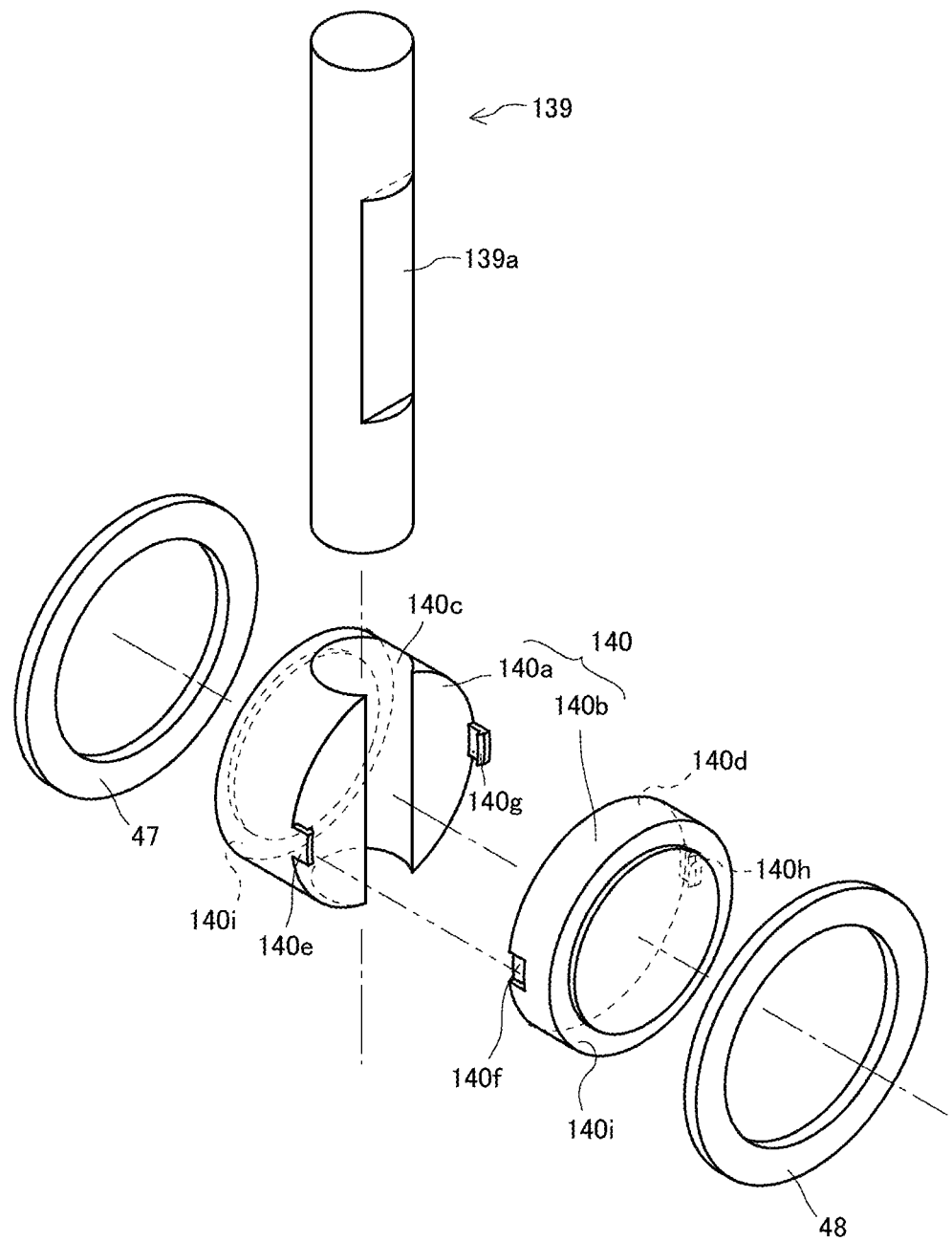
FIG. 7 is a perspective view showing a state where a differential pinion shaft is mounted to a holder in the differential gear according to the second embodiment.

As shown in FIG. 6, in the differential gear according to the present embodiment, a differential case 30 is rotatably supported inside an axle housing.

A differential pinion shaft 139 is housed inside the differential case 30 such that an axial direction thereof is along a direction (a front-rear direction in FIG. 6) orthogonal to the rotation axis of the differential case 30. Specifically, as shown in FIG. 6, shaft support holes 31c and 31c are formed in the middle of the left differential case 31 in the left-right direction so as to face each other, and the differential pinion shaft 139 is inserted through the shaft support holes 31c and 31c. In a state where the differential case 30 and a final gear 35 are integrally coupled, the differential pinion shaft 139 is prevented from slipping out by the final gear 35. As shown in FIGS. 6 and 7, a planar surface portion 139a which is an engaging portion formed by partly cutting the differential pinion shaft 139 is formed in the middle of the differential pinion shaft 139 in the axial direction.

A first pinion gear 37 and a second pinion gear 38 are provided around the differential pinion shaft 139 inside the differential case 30 so as to be rotatable with reference to the axis of the differential pinion shaft 139. The first pinion gear 37 and the second pinion gear 38 are provided so as to mesh with first and second side gears 41 and 42, respectively. The first side gear 41 and the second side gear 42 are connected via the first pinion gear 37 and the second pinion gear 38. Therefore, when either one of the first side gear 41 and the second side gear 42 rotates relative to the differential case 30, the other rotates in the opposite direction relative to the differential case 30.

A holder 140 into which the differential pinion shaft 139 is inserted is provided between the first pinion gear 37 and the second pinion gear 38 inside the differential case 30. As shown in FIGS. 6 and 7, the holder 140 is a columnar member which can be divided in the thickness direction in a plane parallel to the bottom surface (plane orthogonal to the axis). Specifically, the holder 140 has a left holder half 140a disposed on the left side and a right holder half 140b disposed on the right side, the left holder half 140a and the right holder half 140b being joined to each other in the differential case 30 such that they can be separated from each other.

A through hole 140c is formed in the left holder half 140a in the diameter direction. The differential pinion shaft 139 is inserted through the through hole 140c. The through hole 140c is formed such that a part thereof in the circumferential direction is cut (discontinuous). The planar surface portion 139a of the differential pinion shaft 139 and the right side surface of the left holder half 140a are formed to be flush with each other, when the differential pinion shaft 139 is inserted through the through hole 140c. Engagement pieces 140e and 140g projecting rightward are formed on the outer peripheral end of the right side surface of the left holder half 140a so as to face each other.

On the other hand, engaged holes 140f and 140h are formed to face in opposite directions on the outer peripheral end of the left side surface of the right holder half 140b at positions corresponding to the engagement pieces 140e and 140g. To construct the holder 140, the engagement pieces 140e and 140g are inserted and engaged with the engaged holes 140f and 140h with the differential pinion shaft 139 being inserted through the through hole 140c, whereby the left holder half 140a and the right holder half 140b are combined. As described above, the holder 140 is divided into the left holder half 140a and the right holder half 140b so that the holder 140 can be externally fitted to the differential pinion shaft 139.

When combining the left holder half 140a and the right holder half 140b, a left side surface 140d which is the engaged portion of the right holder half 140b is in contact with the planar surface portion 139a of the differential pinion shaft 139 and the right side surface of the left holder half 140a, as shown in FIG. 6. In this manner, the planar surface portion 139a serving as the engaging portion and the left side surface 140d serving as the engaged portion are engaged with each other, and thus, the differential pinion shaft 139 and the holder 140 cannot rotate relative to each other.

In the present embodiment, the planar surface portion 139a and the left side surface 140d are brought into contact with each other to restrict the relative rotation between the differential pinion shaft 139 and the holder 140. However, the present invention is not necessarily limited to the configuration in the present embodiment. In other words, any other configurations may be applied such as a configuration in which a recess and a corresponding protrusion are formed, as long as the engaging portion of the differential pinion shaft 139 and the engaged portion of the holder 140 are engaged with each other to restrict the relative rotation.

Stepped portions 140i and 140i in which the outer peripheral end is reduced in the thickness direction are formed on both left and right side surfaces of the holder 140. Plain bearings 47 and 48 are externally fitted to the stepped portions 140i and 140i. As shown in FIG. 6, when the differential case 30 is assembled, the plain bearing 47 is interposed between the holder 140 and the first side gear 41, and the plain bearing 48 is interposed between the holder 140 and the second side gear 42. That is, the holder 140 is sandwiched between the first side gear 41 and the second side gear 42 via the plain bearings 47 and 48. With this configuration, relative rotation of the holder 140 with respect to the differential case 30 is restricted. That is, the differential pinion shaft 139, which cannot be rotated relative to the holder 140, also cannot be rotated relative to the differential case 30.

In the differential gear according to the present embodiment, when the differential pinion shaft 139 is fixed so as not to rotate relative to the differential case 30, the holder 140 is provided between the first pinion gear 37 and the second pinion gear 38 in the differential case 30, and the engaging portion of the differential pinion shaft 139 and the engaged portion of the holder 140 are engaged with each other to inhibit the relative rotation between the holder 140 and the differential pinion shaft 139, as described above. Then, the holder 140 is held by the first side gear 41 and the second side gear 42, whereby the differential pinion shaft 139 is unable to rotate relative to the differential case 30.

Thus, according to the present embodiment, it is unnecessary to form a hole, into which the fixing pin for the differential pinion shaft 139 is inserted, in the outer peripheral surface of the differential case 30 in a direction orthogonal to the differential pinion shaft 139. Therefore, the size of the differential case 30 in the axial direction of the differential pinion shaft 139 can be reduced.

Next, a differential gear 210 according to a third embodiment will be described with reference to FIGS. 8 to FIG. 12.

As shown in FIGS. 8 to FIG. 11, the differential gear 210 includes an axle housing 1, an input gear 21, a differential case 30, a final gear 35, first and second side gears 41 and 42, first and second pinion gears 37 and 38, third and fourth pinion gears 237 and 238, first differential pinion shafts 239a and 239b, a second differential pinion shaft 239c, a holder 240, and the like as main components. In the present specification, directions of the differential gear 210 are defined by arrows shown in each drawing. For convenience of description, the final gear 35 and the second side gear 42 are not shown in FIG. 9. The respective components will be described below in order.

Figure 8:
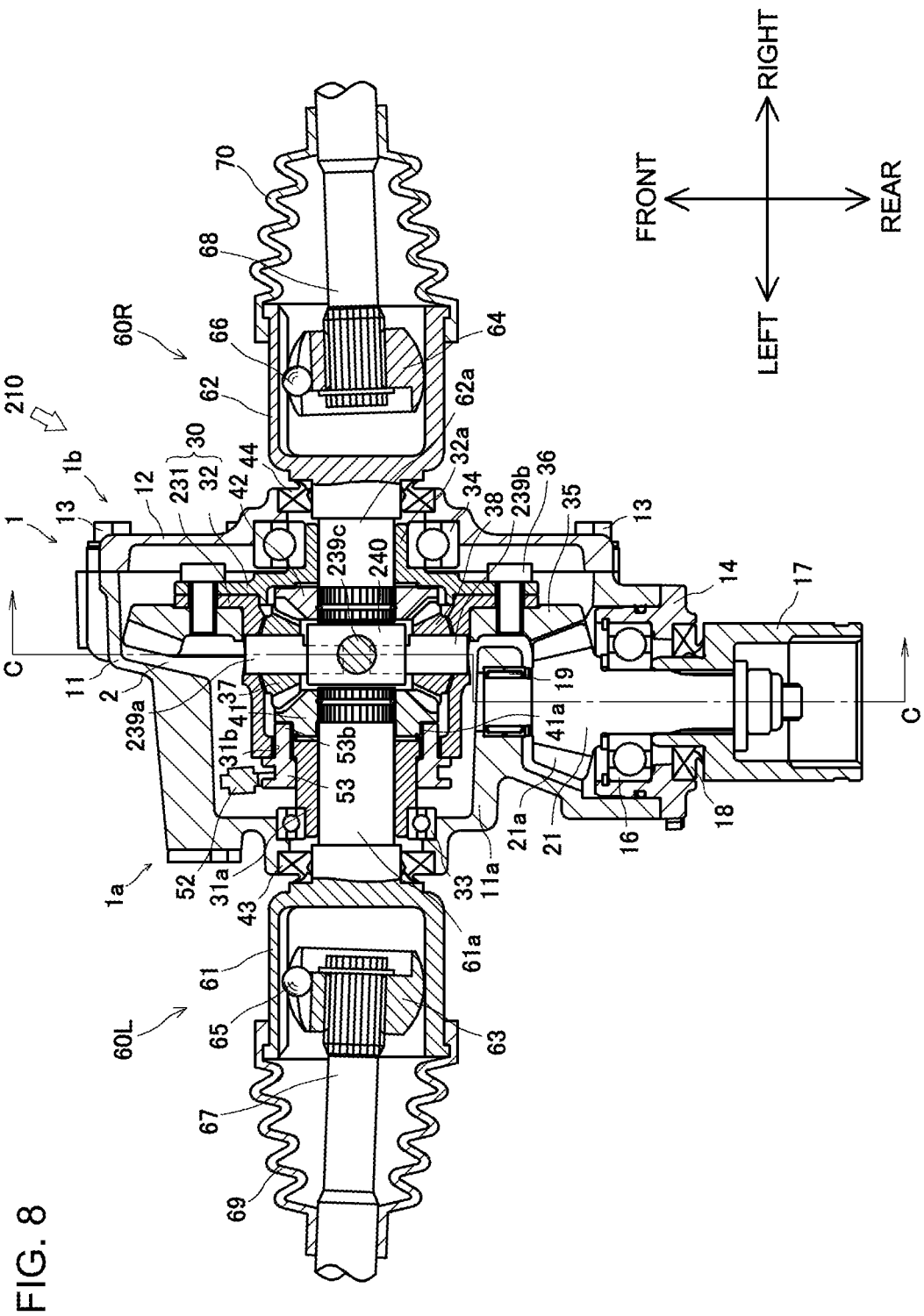
FIG. 8 is a sectional plan view of a differential gear according to a third embodiment in a state where both axle shafts are attached.

As shown in FIG. 8, in the differential gear according to the present embodiment, the differential case 30 is rotatably supported inside the axle housing. The differential case 30 is formed by integrally combining a cylindrical left differential case 231 having a right-side opening and a disk-shaped right differential case 32 such that the right differential case 32 is brought into contact with the opening of the left differential case 231.

The final gear 35 which is a ring-shaped bevel gear is connected to the differential case 30 so as to be relatively non-rotatable. Specifically, in a state in which the left differential case 231 is inserted inside the final gear 35, a bolt 36 passing through the left differential case 231 and the right differential case 32 is screwed into the final gear 35, whereby the left differential case 231, the right differential case 32, and the final gear 35 are integrally coupled. The final gear 35 in a differential gear chamber 2 meshes with a bevel gear tooth portion 21a of the input gear 21. Thus, the rotation of the power transmission shaft input from the input member 17 and the input gear 21 is transmitted to the differential case 30 via the final gear 35.

First differential pinion shafts 239a and 239b are housed inside the differential case 30 such that an axial direction thereof is along a direction (a front-rear direction in FIG. 9) orthogonal to the rotation axis of the differential case 30. The first differential pinion shafts 239a and 239b are formed by connecting two shaft members in series in the axial direction. A second differential pinion shaft 239c is housed inside the differential case 30 such that the axial direction thereof is along a direction (a left-right direction in FIG. 9) orthogonal to both the rotation axis of the differential case 30 and the first differential pinion shafts 239a and 239b.

Figure 9:
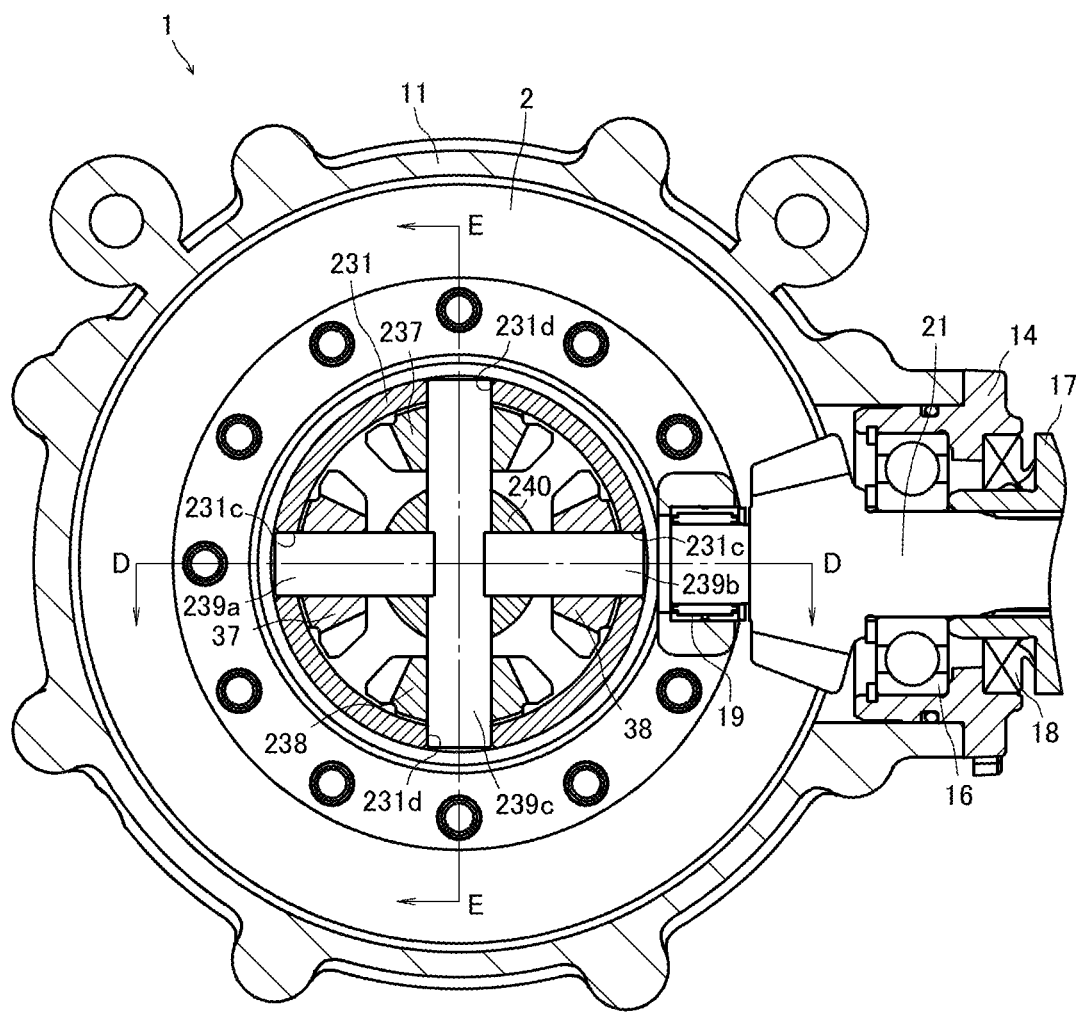
FIG. 9 is a cross-sectional view taken along a line C-C in FIG. 8.
Figure 9:
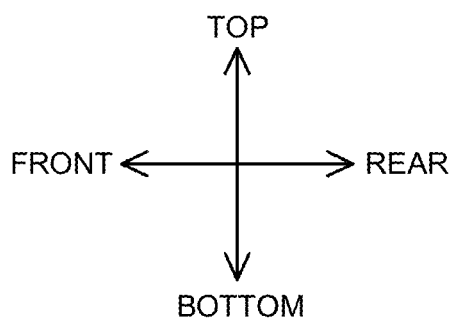
Figure 10:
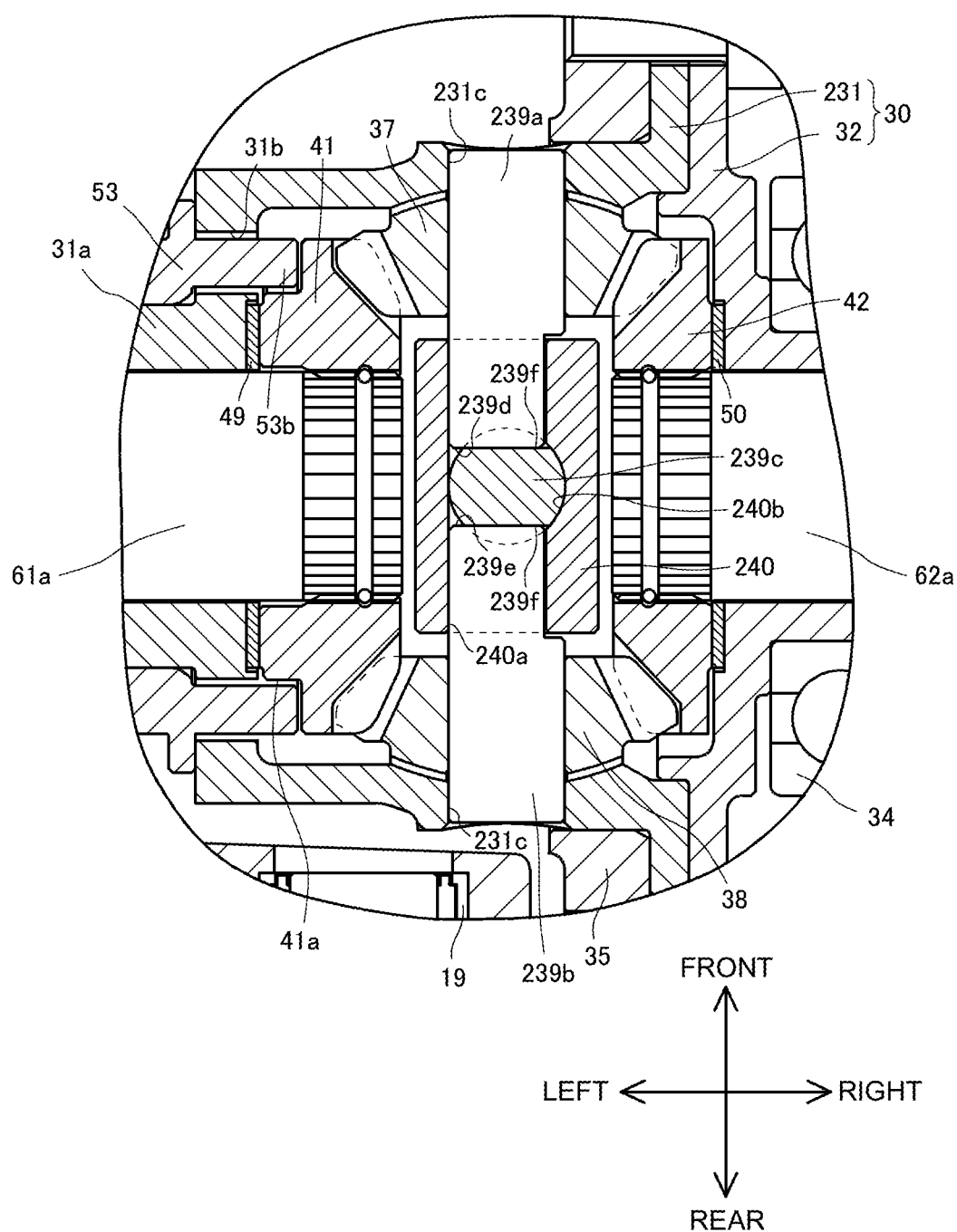
FIG. 10 is a cross-sectional view taken along a line D-D in FIG. 9.
Figure 11:
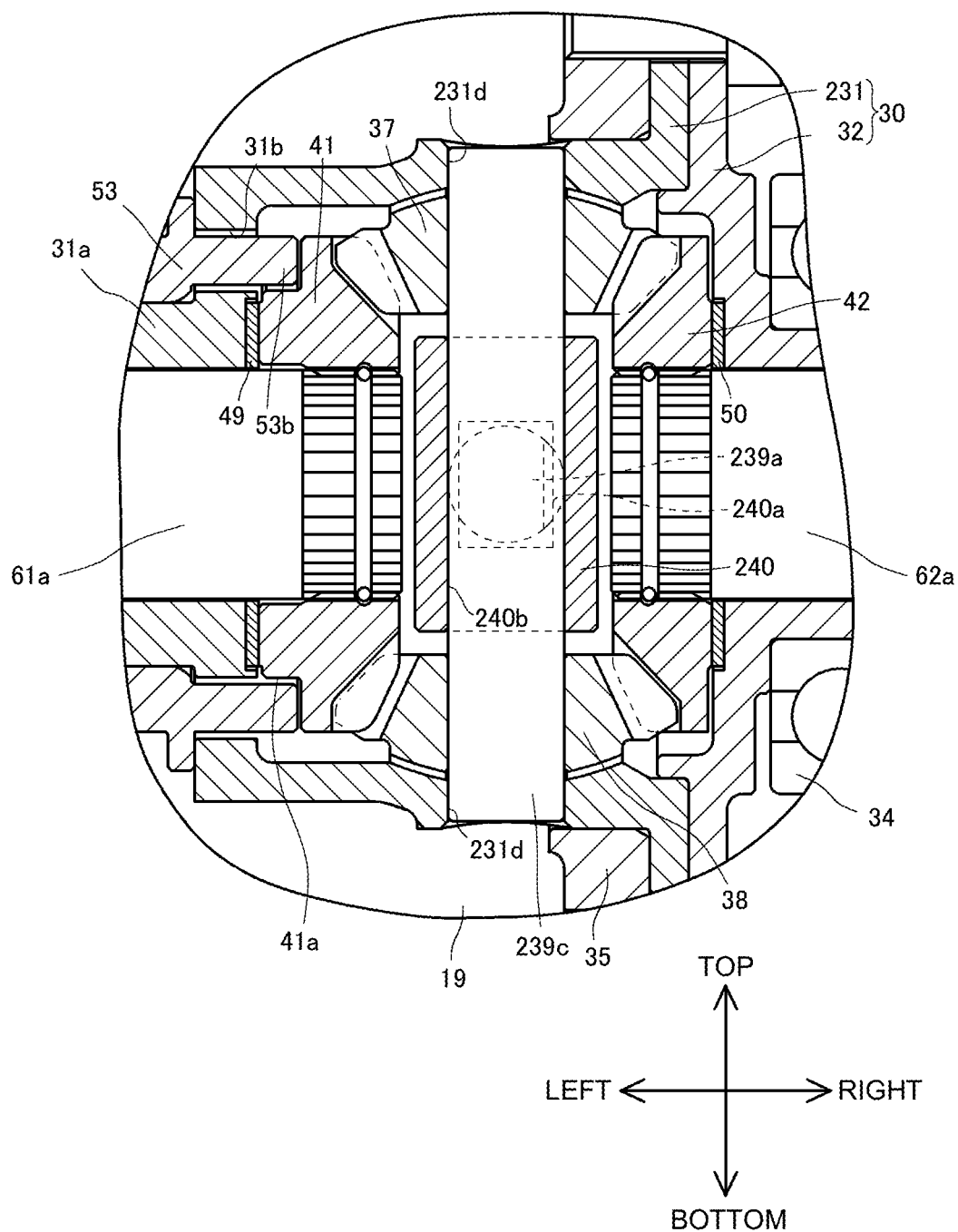
FIG. 11 is a cross-sectional view taken along a line E-E in FIG. 9.

Specifically, as shown in FIGS. 9 to 11, first shaft support holes 231c and 231c are formed so as to face each other in the middle of the left differential case 231 in the left-right direction. In addition, second shaft support holes 231d and 231d are formed so as to face each other at a phase offset of 90 degrees from the first shaft support holes 231c and 231c. The differential pinion shafts 239a and 239b are inserted through the shaft support holes 231c and 231c, respectively, and the differential pinion shaft 239c is inserted through the shaft support holes 231d and 231d. In a state where the differential case 30 and the final gear 35 are integrally coupled, the first and second differential pinion shafts 239a, 239b and 239c are prevented from slipping out by the final gear 35.

Figure 12:
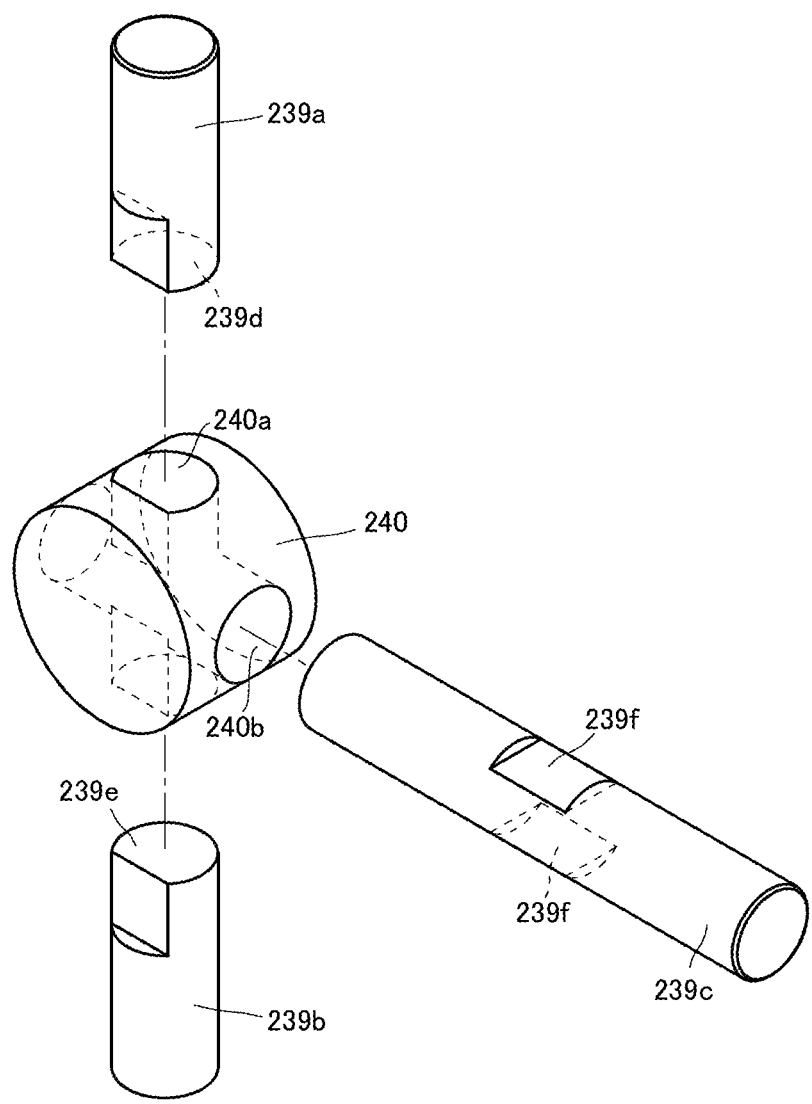
FIG. 12 is a perspective view showing a state where a differential pinion shaft is mounted to a holder in the differential gear according to the third embodiment.

As shown in FIG. 12, planar surface portions serving as engaging portions and formed by partly cutting the first differential pinion shafts 239a and 239b are respectively formed in the first differential pinion shafts 239a and 239b at axial ends (specifically, the ends closer to the other first differential pinion shafts 239a and 239b). Further, as shown in FIG. 12, planar surface portions 239f and 239f serving as engaging portions and formed by partly cutting the second differential pinion shaft 239c are formed so as to face in opposite directions at the central part of the second differential pinion shaft 239c in the axial direction.

The first pinion gear 37 and the second pinion gear 38 are provided around the first differential pinion shafts 239a and 239b inside the differential case 30 so as to be rotatable with reference to the axis of the first differential pinion shafts 239a and 239b. Further, the third pinion gear 237 and the fourth pinion gear 238 are provided around the second differential pinion shaft 239c so as to be rotatable with reference to the axis of the second differential pinion shaft 239c. The first to fourth pinion gears 37, 38, 237 and 238 are provided so as to mesh with the first and second side gears 41 and 42, respectively. The first side gear 41 and the second side gear 42 are connected via the first to fourth pinion gears 37, 38, 237, and 238. Therefore, when either one of the first side gear 41 and the second side gear 42 rotates relative to the differential case 30, the other rotates in the opposite direction relative to the differential case 30.

The holder 240 into which the first and second differential pinion shafts 239a, 239b, and 239c are inserted is provided inside the differential case 30 between the first to fourth pinion gears 37, 38, 237, and 238. As shown in FIG. 12, the holder 240 is a columnar member having a first through hole 240a and a second through hole 240b which are formed in the diameter direction and which are perpendicular to each other. A part of the first through hole 240a in the circumferential direction is linearly formed (the inner peripheral surface is formed into a planar shape).

When attaching the first and second differential pinion shafts 239a, 239b, and 239c to the holder 240, the first differential pinion shafts 239a and 239b are inserted into the first through hole 240a with the second differential pinion shaft 239c being inserted through the second through hole 240b, as shown in FIG. 12. At this time, the planar surface portions of the first differential pinion shafts 239a and 239b are in sliding contact with the planar surface part on the inner peripheral surface of the first through hole 240a. Also, end surfaces 239d and 239e of the first differential pinion shafts 239a and 239b are in contact with the planar surface portions 239f and 239f of the second differential pinion shaft 239c. As a result, axial rotation of the first and second differential pinion shafts 239a, 239b, and 239c is restricted with respect to the holder 240. That is, each of the first and second differential pinion shafts 239a, 239b, and 239c becomes non-rotatable relative to the differential case 30.

In the differential gear 210 according to the present embodiment, when the first and second differential pinion shafts 239a, 239b, and 239c are fixed so as not to rotate relative to the differential case 30, the holder 240 is provided between the first to fourth pinion gears 37, 38, 237, and 238 in the differential case 30, as described above. Then, the first and second differential pinion shafts 239a, 239b, and 239c are engaged with one another inside the holder 240, and thus, they are unable to rotate relative to the differential case 30.

Thus, according to the present embodiment, it is unnecessary to form a hole, into which a fixing pin for the first and second differential pinion shafts 239a, 239b, and 239c are inserted, in the outer peripheral surface of the differential case 30 in a direction orthogonal to the first and second differential pinion shafts 239a, 239b, and 239c. Therefore, it is possible to reduce the size of the differential case 30 in the axial direction of the first and second differential pinion shafts 239a, 239b, and 239c.

In the present embodiment, the planar surface portions of the first differential pinion shafts 239a and 239b are brought into sliding contact with the planar surface part on the inner peripheral surface of the first through hole 240a, and the end surfaces 239d and 239e of the first differential pinion shafts 239a and 239b are brought into contact with the planar surface portions 239f and 239f of the second differential pinion shaft 239c, in order to restrict the relative rotation of the first and second differential pinion shafts 239a, 239b and 239c with respect to the differential case 30. However, the present invention is not necessarily limited to the configuration in the present embodiment. That is, any other configurations can be applied, as long as the first and second differential pinion shafts are engaged with each other inside the holder 240 to restrict the relative rotation with respect to the differential case 30.

The above description relates to specific embodiments of the present invention, and various modifications are possible without departing from the spirit of the present invention. The appended claims are intended to cover such applications within the true scope and spirit of the present invention. Accordingly, the embodiments described in this application are to be considered as illustrative and not to be considered as restrictive. The scope of the present invention is to be expressed in the following claims rather than the above description, and it should be construed that the scope of the present invention covers various modifications within the scope and spirit of the claims and their equivalents.

What is claimed is:

1. A differential gear comprising:
   a gear;
   a differential case to which the gear is fixed on an outer peripheral surface so as to be integrally rotatable;
   a differential pinion shaft that is inserted through a shaft support hole formed in the differential case and that is housed in the differential case such that an axial direction is along a direction perpendicular to a rotation axis of the differential case;
   first and second pinion gears rotatably supported about an axis of the differential pinion shaft around both ends of the differential pinion shaft inside the differential case; and
   first and second side gears that are disposed inside the differential case at a predetermined space, mesh with the first and second pinion gears, and are housed in the differential case so as to be rotatable with reference to an identical rotation axis to the differential case, wherein
   a bulging portion having a flat surface perpendicular to the rotation axis of the differential case is provided at a central part of the differential pinion shaft, and the flat surface is brought into direct or indirect contact with an inner surface of at least one of the first and second side gears,
   wherein an end surface and an opposite end surface of a fixing pin inserted in the fixing hole respectively face the first and second side gears,
   the bulging portion is a holder through which the differential pinion shaft is inserted, and which has the flat surface on an end surface, and
   stepped portions in which an outer peripheral end is reduced in a thickness direction are formed on both left and right side surfaces of the holder.

* * * * *